United States Patent
Ha

(10) Patent No.: US 8,644,386 B2
(45) Date of Patent: Feb. 4, 2014

(54) METHOD OF ESTIMATING DISPARITY VECTOR, AND METHOD AND APPARATUS FOR ENCODING AND DECODING MULTI-VIEW MOVING PICTURE USING THE DISPARITY VECTOR ESTIMATION METHOD

(75) Inventor: Tae-hyeun Ha, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1436 days.

(21) Appl. No.: 11/525,081

(22) Filed: Sep. 22, 2006

(65) Prior Publication Data

US 2007/0064800 A1 Mar. 22, 2007

Related U.S. Application Data

(60) Provisional application No. 60/719,193, filed on Sep. 22, 2005.

(30) Foreign Application Priority Data

Mar. 24, 2006 (KR) .......................... 10-2006-0026984

(51) Int. Cl.
*H04N 7/12* (2006.01)

(52) U.S. Cl.
USPC ..................................................... 375/240.16

(58) Field of Classification Search
USPC ................ 375/240.16–240.25; 348/42–48
See application file for complete search history.

(56) References Cited

U.S. PATENT DOCUMENTS

| | | | |
|---|---|---|---|
| 5,179,441 A * | 1/1993 | Anderson et al. ............... | 348/43 |
| 5,619,256 A | 4/1997 | Haskell et al. | |
| 5,652,616 A * | 7/1997 | Chen et al. ...................... | 348/43 |
| 5,742,689 A | 4/1998 | Tucker et al. | |
| 6,043,838 A * | 3/2000 | Chen ................................ | 348/42 |
| 6,614,910 B1 | 9/2003 | Clemow et al. | |
| 6,999,513 B2 * | 2/2006 | Sohn et al. ............... | 375/240.16 |
| 7,545,974 B2 * | 6/2009 | Jeong et al. ................... | 382/154 |
| 2002/0009137 A1 | 1/2002 | Nelson et al. | |

(Continued)

FOREIGN PATENT DOCUMENTS

| CN | 1450812 A | 10/2003 |
|---|---|---|
| JP | 5-41900 A | 2/1993 |

(Continued)

OTHER PUBLICATIONS

Zhu, et al., "Fast Disparity Estimation Algorithms for Stereo Video Coding Based on MPEG-2", Bulletin of Science and Technology, Jan. 2003, pp. 19-24, vol. 19, No. 1, China Academic Journal Electronics Publishing House, China.

(Continued)

*Primary Examiner* — Dave Czekaj
*Assistant Examiner* — Tracy Li
(74) *Attorney, Agent, or Firm* — Sughrue Mion, PLLC

(57) ABSTRACT

A method and apparatus are provided for encoding and decoding a multi-view moving picture. A method of estimating a disparity vector to encode a multi-view moving picture includes: estimating disparity vectors for a predetermined number of encoded macroblocks; and calculating disparity vectors of macroblocks adjacent to the encoded macroblocks using the estimated disparity vectors. Therefore, it is possible to quickly perform encoding of a multi-view moving picture and enhance compressibility of the multi-view moving picture.

21 Claims, 10 Drawing Sheets

(56) References Cited

U.S. PATENT DOCUMENTS

| | | |
|---|---|---|
| 2003/0202586 A1 | 10/2003 | Jeon |
| 2003/0202592 A1 | 10/2003 | Sohn et al. |
| 2004/0057515 A1 | 3/2004 | Koto et al. |
| 2004/0101058 A1* | 5/2004 | Sasai et al. ............... 375/240.26 |
| 2004/0114817 A1* | 6/2004 | Jayant et al. ................... 382/239 |
| 2004/0165765 A1 | 8/2004 | Sung et al. |
| 2004/0240725 A1* | 12/2004 | Xu et al. ........................ 382/154 |
| 2004/0252758 A1* | 12/2004 | Katsavounidis et al. .. 375/240.2 |
| 2005/0129114 A1 | 6/2005 | Jeon |
| 2005/0129126 A1 | 6/2005 | Jeon |
| 2005/0129127 A1 | 6/2005 | Jeon |
| 2006/0132610 A1* | 6/2006 | Xin et al. ................. 348/207.99 |
| 2007/0189388 A1 | 8/2007 | Jeon |

FOREIGN PATENT DOCUMENTS

| | | |
|---|---|---|
| JP | 5-168096 A | 7/1993 |
| JP | 6-113335 A | 4/1994 |
| JP | 10-191394 A | 7/1998 |
| JP | 2004-165703 A | 6/2004 |
| KR | 20030056267 A | 7/2003 |
| KR | 20030083285 A | 10/2003 |
| KR | 1020040070892 A | 8/2004 |
| KR | 10-2005-0060789 A | 6/2005 |
| KR | 10-2005-0076441 A | 7/2005 |
| KR | 10-2005-0119605 A | 12/2005 |
| WO | 03056843 A1 | 7/2003 |
| WO | 2004021711 A1 | 3/2004 |

OTHER PUBLICATIONS

HuiZhu Jia, et al., "Stereoscopic Video Coding Based on Global Displacement Compensated Prediction", 2003 IEEE, pp. 1-5, Beijing, China.

Kim, et al., Efficient disparity vector coding for multiview sequences, Signal Processing. Image Communication, Elsevier Science Publishers, Amsterdam, NL, vol. 19, No. 6, Jul. 1, 2004, pp. 539-553, XP004517248, ISSN: 0923-5965, DOI: DOI:10.1016/J.IMAGE.2004.04.004.

Kossentini, et al., "Predictive RD Optimized Motion Estimation for Very Low Bit-Rate Video Coding", IEEE Journal on Selected Areas in Communications, IEEE Service Center, Piscataway, US, vol. 15. No. 9, Dec. 1, 1997, XP011054728, ISSN: 0733-8716.

Li, et al., "Direct Mode Coding for Bipredictive Slices in the H.264 Standard", IEEE Transactions on Circuits and Systems for Video Technology, IEEE Service Center, Piscataway, NJ, US, vol. 15, No. 1, Jan. 1, 2005, pp. 119-126, XP011124673, ISSN: 1051-8215, DOI: DOI:10.1109/TCSVT.2004.837021.

Yang, et al., "Joint Motion and Disparity Fields Estimation for Stereoscopic Video Sequences", Signal Processing. Image Communication, Elsevier Science Publishers, Amsterdam, NL, vol. 20, No. 3, Mar. 1, 2005, pp. 265-276, XP025323855, ISSN: 0923-5965, DOI: DOI:10.1016/J.IMAGE.2004.12.003.

Communication and Extended European Search Report issued Mar. 24, 2011 in counterpart European Application No. 06798854.3.

Office Action issued Jun. 30, 2011 by the State Intellectual Property Office of P.R. China; in counterpart Chinese Patent Application No. 200680030828.5.

Communication dated Oct. 4, 2011, issued by the Japanese Patent Office in Japanese Patent Application No. 2008-532162.

Communication dated Jun. 19, 2012 issued by the Korean Intellectual Property Office in counterpart Korean Application No. 10-2006-0026984.

Communication dated Aug. 16, 2012 issued by the Korean Intellectual Property Office in counterpart Korean Application No. 10-2006-0026984.

Kim, Yongtae, et al., "Multi-view video coding using efficient disparity vector prediction", The Korean Society of Broadcast Engineers Magazine, 2005, pp. 621-631.

Communication dated Mar. 13, 2012 issued by the Japanese Patent Office in counterpart Japanese Application No. 2008-532162.

Communication dated Mar. 24, 2011 issued by the European Patent Office in European Application No. 06798854.3.

Communication dated May 9, 2012 issued by the European Patent Office in the counterpart European Application No. 06798854.3.

Communication dated Oct. 31, 2012 issued by the Korean Intellectual Property Office in counterpart Korean Patent Application No. 10-2006-0026984.

Written Opinion (PCT/ISA/237) issued Dec. 22, 2006 from the International Searching Authority in counterpart application No. PCT/KR2006/003771.

International Search Report (PCT/ISA210 & PCT/ISA/220) issued Dec. 22, 2006 from the International Searching Authority in counterpart application No. PCT/KR2006/003771.

Communication, dated Jul. 22, 2013, issued by the State Intellectual Property Office of the People's Republic of China, in counterpart Application No. 200680030828.5.

* cited by examiner

METHOD OF ESTIMATING DISPARITY VECTOR, AND METHOD AND APPARATUS FOR ENCODING AND DECODING MULTI-VIEW MOVING PICTURE USING THE DISPARITY VECTOR ESTIMATION METHOD

CROSS-REFERENCE TO RELATED PATENT APPLICATION

This application claims priority from U.S. Provisional Patent Application No. 60/719,193, filed on Sep. 22, 2005, and Korean Patent Application No. 10-2006-0026984, filed on Mar. 24, 2006 in the Korean Intellectual Property Office, the disclosures of which are incorporated herein in their entirety by reference.

BACKGROUND OF THE INVENTION

1. Field of the Invention

Methods and apparatuses consistent with the present invention relate to encoding and decoding a multi-view moving picture, and more particularly, to a disparity vector estimation method of quickly encoding a multi-view moving picture and improving compressibility of the multi-view moving picture, and a method and apparatus for encoding and decoding a multi-view moving picture using the disparity vector estimation method.

2. Description of the Related Art

Realism is an important factor in achieving high-quality information and telecommunication services. This realism can be achieved with video communication based on three-dimensional (3D) images. 3D image systems have many potential applications in education, entertainment, medical surgery, videoconferencing, and the like. To provide viewers with more vivid and accurate information of a remote scene, three or more cameras are placed at slightly different viewpoints to produce a multi-view sequence.

Reflecting the current interest in 3D images, a number of research groups have developed 3D-image processing and display systems. In Europe, research on 3DTV has been initiated through several projects such as DISTIMA, the objective of which is to develop a system for capturing, coding, transmitting, and displaying digital stereoscopic image sequences. These projects have led to another project, PANORAMA, with the goal of enhancing visual information in 3D telepresence communication. These projects have also led to another project, ATTEST, in which various technologies for 3D-content acquisition, 3D-compression & transmission, and 3D-display systems were researched. In the ATTEST project, Motion Picture Experts Group 2 (MPEG-2) and Digital Video Broadcasting (DVB) standards were applied to transmit 3D contents using temporal scalability. In temporal scaling, a base layer is used for the transmission of 2D contents and an enhancement layer is used for the transmission of 3D contents.

The MPEG-2 standard was amended in 1996 to define a multiview profile (MVP). The MVP defines the usage of a temporal scalability mode for multi-camera sequences and acquisition camera parameters in an MPEG-2 syntax.

A base-layer stream which represents a multiview video signal can be encoded at a reduced frame rate, and an enhancement-layer stream, which can be used to insert additional frames in between, can be defined to allow reproduction at a full frame rate when both streams are available. A very efficient way to encode the enhancement layer is to determine the optimal method of performing motion-compensated estimation on each macroblock in an enhancement layer frame based on either a base layer frame or a recently reconstructed enhancement layer frame.

The process of stereo and multiview channel encoding such a multiview video signal using temporal scalability syntax is straightforward. For this purpose, a frame from a particular camera view (usually a left-eye frame) is defined as the base layer, and a frame from the other camera view is defined as the enhancement layer. For the enhancement layer, although disparity-compensated estimation may fail in occluded regions, it is still possible to maintain the quality of a reconstructed image using motion-compensated estimation within the same channel. Since the MPEG-2 MVP was mainly defined for stereo sequences, it does not support multiview sequences and is inherently difficult to extend to multiview sequences.

FIG. 1 is a block diagram illustrating an encoder and decoder of the MPEG-2 MVP.

Referring to FIG. 1, the MPEG-2 MVP (13818-2) encodes and reproduces a three-dimensional (3D) moving picture using a left view picture and a right view picture, by utilizing a scalable codec that detects the correlation between the left and right view pictures and variably encodes a difference between the left and right view pictures according to a network status. Here, the left view picture is defined as a base layer moving picture and the right view picture is defined as an enhancement layer picture. The base layer picture can be encoded in its original form, and the enhancement layer picture is additionally encoded and transmitted in order to enhance the quality of the base layer moving picture when the network status is stable. As such, encoding using both the base layer moving picture and the enhancement layer picture is called scaleable coding.

The left view picture is encoded by a first motion compensated DCT encoder 110. A difference between the left view picture and the right view picture is calculated by a disparity estimator 122 for estimating the difference of the disparity between the left view picture and the right view picture, and a disparity compensator 124, and then is encoded by a second motion compensated DCT encoder 126. The first motion compensated DCT encoder 110 for encoding the left view picture is referred to as a base layer picture encoder, and the disparity estimator 122, the disparity compensator 124, and the second motion compensated DCT encoder 126 for encoding a disparity between the right view picture and the left view picture constitute an enhancement layer picture encoder 120. The encoded base layer picture and the enhancement layer picture are multiplexed by a system multiplexer 130 and then transferred to a decoder.

The multiplexed signal is divided into a left view picture and a right view picture by a system demultiplexer 140. The left view picture is decoded by a first motion compensated DCT decoder 150. A disparity picture is restored to the right view picture by a second motion compensated DCT decoder 164 and a disparity compensator 162 which compensates for the disparity between the left view picture and the right view picture. The first motion compensated DCT decoder 150 for decoding the left view picture is referred to as a base layer picture decoder, and the disparity compensator 162 and the second motion compensated DCT decoder 164 for measuring the disparity between the right view picture and the left view picture and decoding the right view picture constitute an enhancement layer picture decoder 160.

FIG. 2 is a view for explaining disparity-based estimation encoding in which disparity estimation is used twice for bi-directional motion estimation.

A left view picture is encoded by a non-scalable MPEG-2 encoder, and a right view picture is encoded by a MPEG-2 temporal auxiliary view encoder on the basis of the decoded left view picture.

That is, the right view picture is encoded to a bi-directional (B) image using estimation results obtained from two reference pictures, for example, two left view pictures. One of the two reference pictures is a left view picture to be displayed simultaneously with the right view picture and the other reference picture is a left view picture to be displayed temporally subsequently.

Also, the two estimation results have three estimation modes including a forward mode, a backward mode, and an interpolated mode, similar to motion estimation/compensation. Here, the forward mode indicates a disparity estimated from the isochronal left view picture, and the backward mode indicates a disparity estimated based on the left view picture that immediately follows the isochronal left view image. In this method, since a right view picture is estimated by disparity vectors of two left view pictures, this estimation method is called disparity-based estimation encoding. Accordingly, the encoder estimates two disparity vectors for each frame of a right view moving picture, and the decoder decodes the right moving picture from left view moving pictures using the two disparity vectors.

FIG. 3 is a view for explaining estimation encoding using disparity vectors and motion vectors for interpolated estimation.

In FIG. 3, B pictures are used for interpolated estimation as illustrated in FIG. 2. However, here, the interpolated estimation uses a disparity estimation and a motion estimation. That is, a disparity estimation result obtained from an isochronal left view picture and a motion estimation result obtained from a right view picture at the previous time are used.

Like disparity-based estimation encoding, estimation encoding using disparity vectors and motion vectors also include three estimation modes comprising a forward mode, a backward mode, and an interpolated mode. Here, the forward mode indicates a motion estimation obtained from a decoded right view picture, and the backward mode indicates a disparity estimation obtained from a decoded left view picture.

As described above, since the MPEG-2 MVP specification does not consider itself an encoder for a multi-view moving picture, it is not designed to be suitable for an actual stereo moving picture. Therefore, an encoder which is able to efficiently provide a multi-view moving picture in order to provide a three-dimensional effect and reality simultaneously to a plurality of people, is needed.

A new H.264 video coding standard for high encoding efficiency compared to related art standards has been developed. The new H.264 video coding standard depends on various new characteristics, considering a variable block size between 16×16 and 4×4, a quadtree structure for motion compensation in a loop deblocking filter, a multi-reference frame, intra prediction, and context adaptability entropy coding, as well as considering general B estimation slices. Unlike the MPEG-2 standard, the MPEG-4 Part 2 standard, etc., the B slices can be referred different slices while using multi-prediction obtained from the same direction (forward or backward). However, the above-described characteristics require a great amount of bits for motion information including an estimation mode and motion vector and reference image in an estimation mode for the H.264 video coding standard.

In order to overcome this problem, a skip mode and a direct mode can be respectively introduced into predictive (P) slices and B slices. The skip and direct modes allow motion estimation of an arbitrary block of a picture to be currently encoded, using motion vector information previously encoded. Accordingly, additional motion data for macroblocks (MBs) or blocks is not encoded. Motions for these modes are obtained using spatial (skip) or temporal (direct) correlation of motions of adjacent MBs or pictures.

FIG. 4 is a view for explaining a direct mode of a B picture.

In the direct mode, a forward motion vector and a backward motion vector are obtained using a motion vector of a co-located block of a temporally following P image, when estimating a motion of an arbitrary block of a B picture to be currently encoded.

In order to calculate a forward motion vector $MV_{L0}$ and a backward motion vector $MV_{L1}$ of a direct mode block 402 whose motion will be estimated in a B picture 410, a motion vector MV for a reference list 0 image 430, which has a co-located block 404 (which is at the same position as the direct mode block 402) in a reference list 1 picture 420 as a temporally following picture is detected. Thus, the forward motion vector $MV_{L0}$ and the backward motion vector $MV_{L1}$ of the direct mode block 402 of the B picture 410 are calculated using Equation 1 as follows:

$$\overrightarrow{MV}_{L0} = \frac{TR_B}{TR_D} \times \overrightarrow{MV} \quad (1)$$

$$\overrightarrow{MV}_{L1} = \frac{(TR_B - TR_D)}{TR_D} \times \overrightarrow{MV},$$

where MV represents the motion vector of the co-located block 404 of the reference list 1 picture 420, $TR_D$ represents a distance between the reference list 0 picture 430 and the reference list 1 picture 420, and $TR_B$ represents a distance between the B picture 410 and the reference list 0 picture 430.

FIG. 5 is a view for explaining a method of estimating a motion vector in a spatial area.

According to the H.264 standard used for encoding moving picture data, a frame is divided into blocks, each having a predetermined size, and a motion searching for a most similar block to an adjacent frame(s) subjected to encoding is performed. That is, an intermediate value of motion vectors of a left macroblock 4, an upper middle macroblock 2, and an upper right macroblock 3 of a current macroblock c is determined as an estimation value of the corresponding motion vector. The motion vector estimation can be expressed by Equation 2 as follows:

$$\begin{cases} pmvx = \text{MEDIAN}(mvx2, mvx3, mvx4) \\ pmvy = \text{MEDIAN}(mvy2, mvy3, mvy4) \end{cases} \quad (2)$$

As such, a method of encoding a moving picture using spatial correlation as well as temporal correlation has been proposed. However, a method of enhancing the compressibility and processing speed of a multi-view moving picture having significantly more information than a general moving picture, is still required.

SUMMARY OF THE INVENTION

The present invention provides a method and apparatus for encoding a multi-view moving picture, in order to enhance the compressibility of the multi-view moving picture and quickly perform encoding of the multi-view moving picture using a correlation between disparity vectors for multi-view pictures photographed by multi-view cameras.

The present invention also provides a method and apparatus for decoding a multi-view moving picture in order to decode an encoded multi-view moving picture using a correlation between disparity vectors for multi-view pictures.

According to an aspect of the present invention, there is provided a method of estimating a disparity vector to encode a multi-view moving picture, including: estimating disparity vectors for a predetermined number of encoded macroblocks; and calculating disparity vectors of macroblocks adjacent to the encoded macroblocks using the estimated disparity vectors.

The estimating the disparity vectors includes estimating the disparity vectors for the predetermined number of encoded macroblocks using a full-search method or a fast-search method, and calculating the disparity vectors includes interpolating and calculating the disparity vectors of the macroblocks adjacent to the encoded macroblocks using a predetermined interpolation equation.

The predetermined interpolation equation is selected according to a characteristic of the disparity vectors determined for the encoded macroblocks, and the characteristic of the disparity vectors comprises information indicating whether deviation of the estimated disparity vectors is constant.

According to another aspect of the present invention, there is provided a multi-view moving picture encoding apparatus including: a direct mode performing unit which receives a current frame and a reference frame, estimates disparity vectors for a predetermined number of encoded macroblocks, and calculates disparity vectors of macroblocks adjacent to the encoded macroblocks using the estimated disparity vectors; an interpolation equation providing unit which provides an interpolation equation for calculating the disparity vectors of the macroblocks adjacent to the encoded macroblocks to the direct mode performing unit; a search mode performing unit which receives the current frame and the reference frame and searches for the current frame and the reference frame to estimate disparity vectors; a cost calculator which calculates a cost according to a disparity vector determining method performed by the direct mode performing unit and a cost according to a disparity vector determining method performed by the search mode performing unit; a comparator which compares the calculated costs with each other; a mode selector which selects an encoding mode according to the comparison result; and an encoder which encodes a multi-view moving picture according to the selected encoding mode.

The direct mode performing unit estimates the disparity vectors for the predetermined number of encoded macroblocks using a full-search method or a fast-search method, and interpolates and calculates the disparity vectors of the macroblocks adjacent to the encoded macroblocks using a predetermined interpolation equation.

The interpolation equation providing unit stores at least one interpolation equation which can be selected according to a characteristic of disparity vectors estimated for the predetermined number of encoded macroblocks.

The cost calculator includes: a direct mode cost calculator which calculates a direct mode cost using a disparity vector $DV\_d$ calculated by the direct mode performing unit; and a search mode cost calculator which calculates a search mode cost using a disparity vector $DV\_f$ estimated by the search mode performing unit.

The cost calculator calculates a bit rate and/or a Peak Signal to Noise Ratio (PSNR) for each of the direct mode and the search mode.

The comparator compares a difference between the direct mode cost and the search mode cost with a predetermined threshold value, and the mode selector sets a flag according to the comparison result and selects an encoding mode according to the set flag.

The comparator compares a difference between a disparity vector $DV\_d$ determined according to the direct mode and a disparity vector $DV\_f$ determined according to the search mode, with a predetermined threshold value, when the difference between the direct mode cost and the search mode cost is greater than the predetermined threshold value. The mode selector sets a flag according to the comparison result, and selects the encoding mode according to the set flag.

The encoder encodes a residual picture if the selected encoding mode is the direct mode, and encodes a residual picture and the difference between the disparity vector $DV\_d$ determined according to the direct mode and the disparity vector $DV\_f$ determined according to the search mode, if the selected encoding mode is the search mode and the difference between the disparity vector $DV\_d$ determined according to the direct mode and the disparity vector $DV\_f$ determined according to the search mode is smaller than the predetermined threshold value.

The encoder encodes the residual picture and the disparity vector by the search mode, if the selected encoding mode is the search mode and the difference between the disparity vector $DV\_d$ determined according to the direct mode and the disparity vector $DV\_f$ determined according to the search mode is greater than the predetermined threshold value.

According to another aspect of the present invention, there is provided a method of encoding a multi-view moving picture, including: receiving a current frame and a reference frame; performing a direct mode of estimating disparity vectors for a predetermined number of encoded macroblocks, and calculating disparity vectors of macroblocks adjacent to the encoded macroblocks using the estimated disparity vectors; performing a search mode of searching for the current frame and the reference frame and estimating a disparity vector; respectively calculating a cost for the direct mode and a cost for the search mode; comparing the cost for the direct mode with the cost for the search mode; selecting an encoding mode according to the comparison result; and encoding the multi-view moving picture according to the selected encoding mode.

According to another aspect of the present invention, there is provided an apparatus for decoding a multi-view moving picture, including: an encoding mode checking unit which checks a mode information indicating an encoding mode included in a received multi-view moving picture bitstream and checks an encoding mode; a disparity vector determining unit which determines a disparity vector according to the checked encoding mode; and a decoder which decodes a multi-view moving picture, using a disparity vector determined according to the checked encoding mode and residual picture data included in the multi-view moving picture bitstream, wherein the disparity vector determining unit calculates the disparity vector using the same disparity vector interpolation equation as that used in an apparatus for encoding a multi-view moving picture.

If the encoding mode checked by the mode checking unit is a first mode in which a residual picture is received, the disparity vector determining unit calculates the disparity vector using the disparity interpolation equation, and if the encoding mode checked by the mode checking unit is a second mode in which the residual picture and a difference between a disparity vector DV_d determined according to the direct mode and a disparity vector DV_f determined according to the search mode are transmitted, the disparity vector determining unit calculates the disparity vector by summing the difference and the disparity vector calculated using the disparity vector interpolation equation.

According to another aspect of the present invention, there is provided a method of decoding a multi-view moving picture including: determining an encoding mode using a mode information which indicate an encoding mode included in a received multi-view moving picture bitstream; determining a disparity vector according to the encoding mode; and decoding a multi-view moving picture using the disparity vector which was determined according to the encoding mode and residual picture data included in the multi-view moving picture bitstream, wherein the determining the disparity vector comprises calculating the disparity vector using the same disparity vector interpolation equation as that used in an apparatus for encoding a multi-view moving picture.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF EXEMPLARY EMBODIMENTS OF THE INVENTION

Hereinafter, exemplary embodiments of the present invention will be described in detail with reference to the appended drawings.

Figure 1:
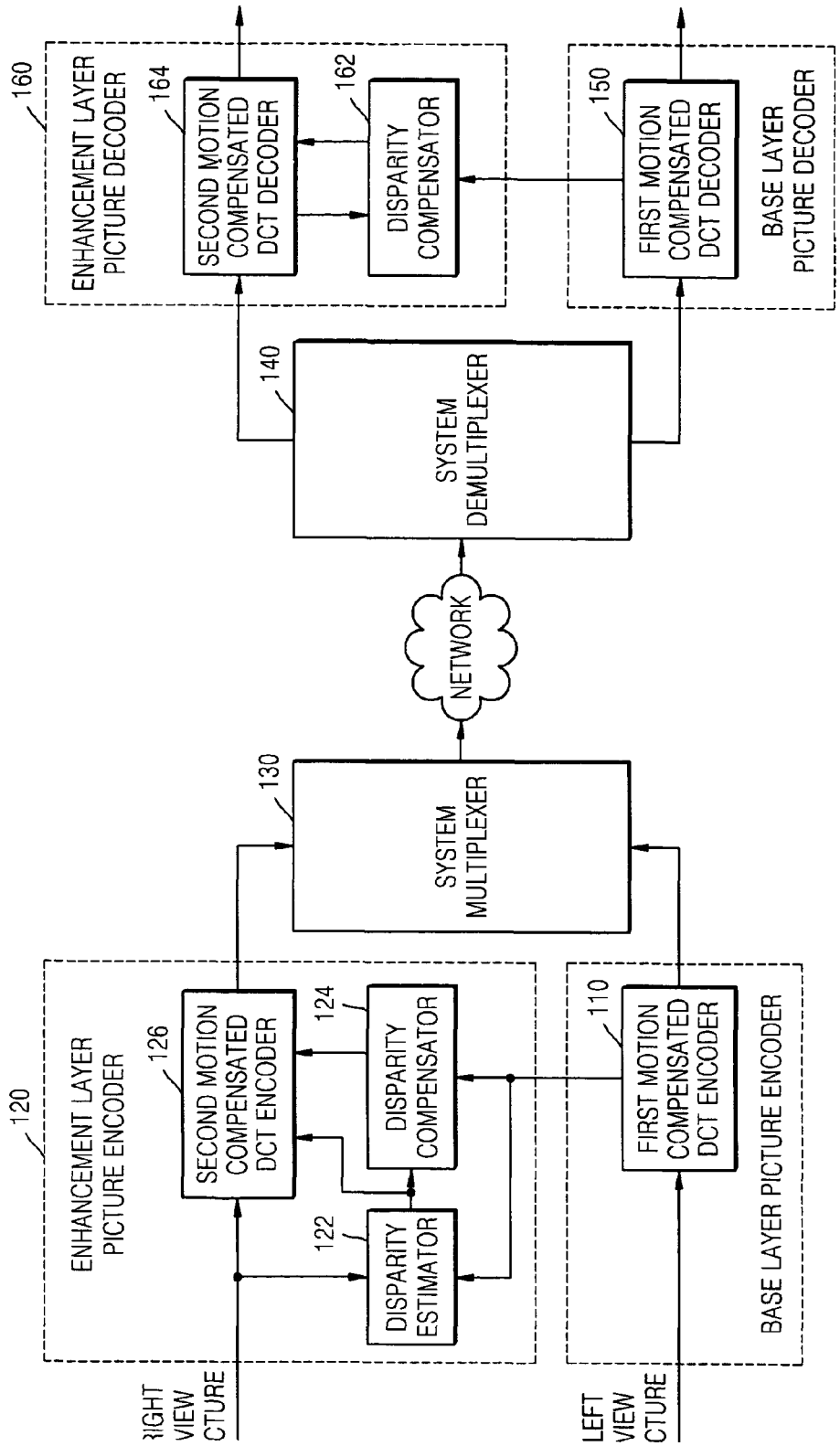
FIG. 1 is a block diagram illustrating stereo moving picture encoding and decoding apparatuses using MPEG-2 Multi-View Profile (MVP)
Figure 2:
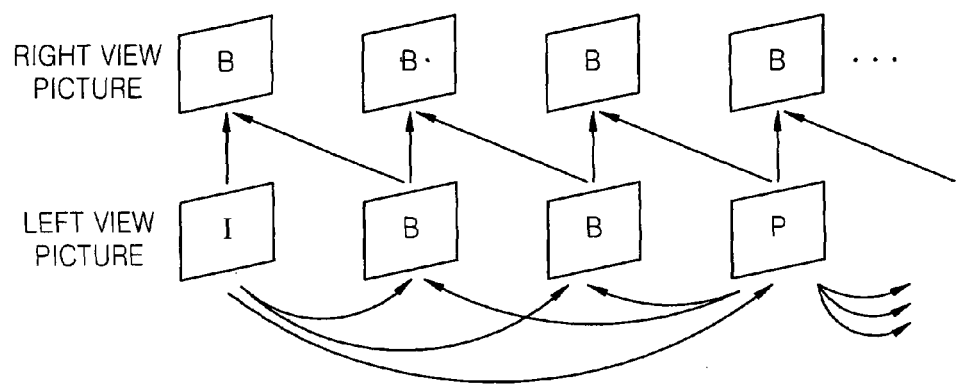
FIG. 2 is a view for explaining disparity-based estimation encoding in which disparity estimation is used twice for bi-directional motion estimation.
Figure 3:
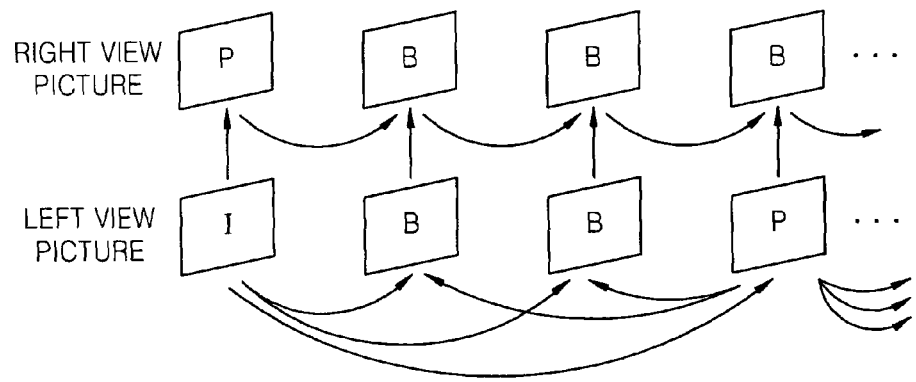
FIG. 3 is a view for explaining estimation encoding using disparity vectors and motion vectors for interpolated estimation.
Figures 4, 5:
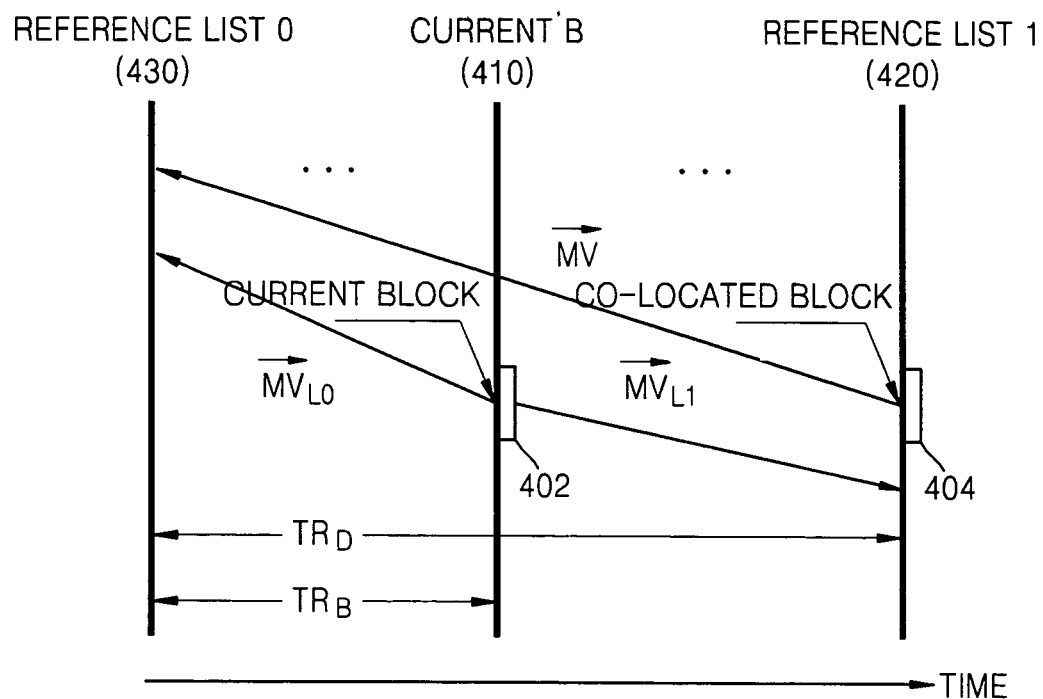
FIG. 4 is a view for explaining a direct mode of a B image.
FIG. 5 is a view for explaining a method of estimating a motion vector in a spatial area.
Figure 6:
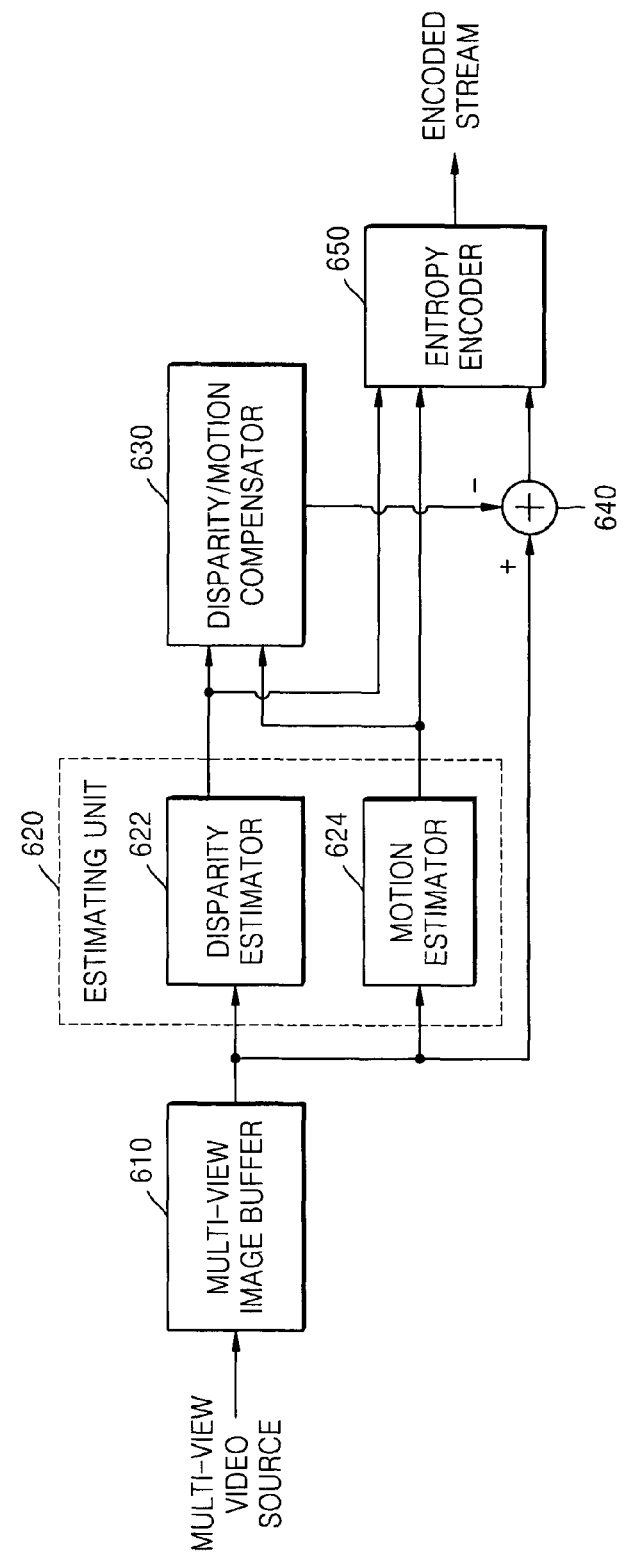
FIG. 6 is a block diagram of a multi-view moving picture encoding apparatus according to an exemplary embodiment of the present invention.

FIG. 6 is a block diagram of a multi-view moving picture encoding apparatus according to an exemplary embodiment of the present invention.

The multi-view moving picture encoding apparatus includes a multi-view image buffer 610, an estimating unit 620, a disparity/motion compensator 630, a residual picture encoder 640, and an entropy encoder 650.

In FIG. 6, the multi-view moving picture encoding apparatus receives multi-view video images obtained from a plurality of video sources such as camera systems or using different methods. The received multi-view video images are stored in the multi-view image buffer 610. The multi-view image buffer 610 provides the stored multi-view video source data or images to the estimating unit 620 and the residual image encoder 640.

The estimating unit 620 includes a disparity estimator 622 and a motion estimator 624, and performs disparity estimation and motion estimation on the stored multi-view video images.

The disparity/motion compensator 630 performs disparity and motion compensation using disparity vectors and motion vectors estimated by the disparity estimator 622 and the motion estimator 624. The disparity/motion compensator 630 reconstructs an image using the estimated motion and disparity vectors and provides the reconstructed image to the residual image encoder 640.

The residual image encoder 640 encodes a residual image obtained by subtracting the image compensated and reconstructed by the disparity/motion compensation unit 630 from the original image provided by the multi-view image buffer 610 and provides the encoded residual image to the entropy encoder 650.

The entropy encoder 650 receives the estimated disparity vectors and the motion vectors generated by the estimating unit 620 and the encoded residual image from the residual image encoder 640, and generates a bitstream for the multi-view video source data.

In the disparity estimator 622 illustrated in FIG. 6, like motion information for motion estimation and motion compensation used for conventional codecs such as the H.264 and MPEG 2/4 standards, disparity information is used for disparity compensation. As in a trial for reducing motion information and increasing encoding efficiency in the H.264 standard, a trial for reducing disparity information and increasing encoding efficiency in multi-view video coding (MVC) is performed.

For that, the disparity estimator 622 estimates disparity vectors for a predetermined number of macroblocks encoded in advance, and calculates disparity vectors of macroblocks adjacent to the encoded macroblocks using the estimated disparity vectors. In more detail, the disparity estimator 622 estimates disparity vectors for a predetermined number of macroblocks encoded in advance using a related art disparity estimation method, such as a full-search method or a fast-search method, and interpolates and calculates disparity vectors of macroblocks adjacent to the encoded macroblocks using a predetermined interpolation equation.

Hereinafter, a method of estimating disparity vectors, according to an embodiment of the present invention, will be described in detail with reference to FIGS. 7 through 12.

In this specification, the predetermined number of macroblocks encoded in advance is called "seed-macroblocks (simply referred to as seed-MBs)". Also, the macroblocks adjacent to the encoded macroblocks, whose disparity vectors are calculated using the estimated disparity vectors, are called "non-seed macroblocks (simply, referred to as non-seed MBs)". Also, in this specification, a method of estimating disparity vectors using the related art search method, is called a "disparity vector search", and a method of calculating disparity vectors according to an embodiment of the present invention is called "disparity vector interpolation" or a "direct mode". Also, a method of encoding a multi-view moving picture using the related art disparity estimation method is called "search mode encoding", and a method of encoding a multi-view moving picture using the disparity vector interpolation according to an exemplary embodiment of the present invention is called "direct mode encoding".

Figure 7:
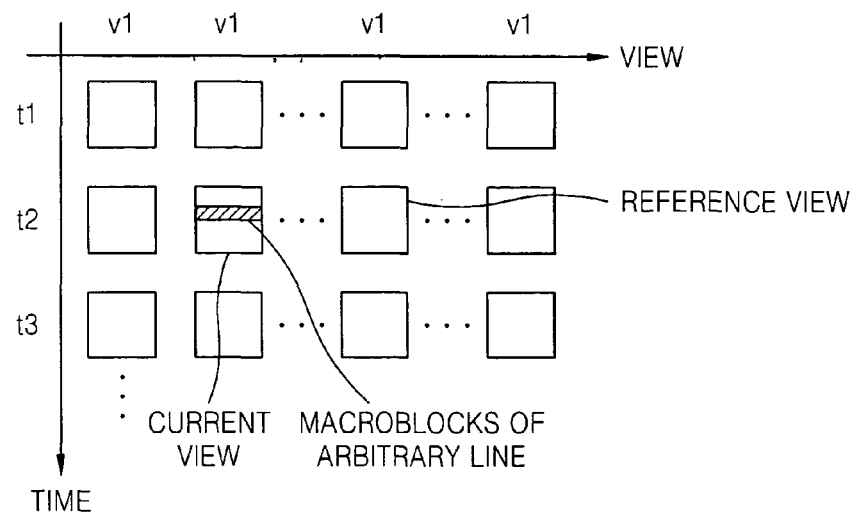
FIG. 7 is a view for explaining frame sequences photographed by multi-view cameras.

FIG. 7 is a view for explaining frame sequences photographed by multi-view cameras.

In FIG. 7, the horizontal axis is a view axis and represents the number of cameras for photographing multi-view pictures. The vertical axis is a time axis and represents the number of time sequences. If the multi-view cameras are arranged in parallel, high correlation will exist between multi-view frames disposed on the same time sequence. Although the multi-view cameras are not arranged in parallel, since pictures photographed by the multi-view cameras can be rectified to a state photographed by multi-view cameras arranged in parallel, correlation between the photographed pictures would exist.

As such, when high correlation between multi-view frames exists, like the direct mode used in the H.264 standard, it is efficient to estimate disparity vectors using "disparity vector interpolation" according to an exemplary embodiment of the present invention. The "disparity vector interpolation" is similar to picture interpolation, picture scaling, or picture reconstruction, which are used for increasing resolution. In picture interpolation, an interpolated picture is obtained by interpolating adjacent pictures of the picture to be interpolated using linear interpolation or cubic interpolation. Also, the disparity vectors can be obtained by vector interpolation similar to the picture interpolation.

Figure 8:
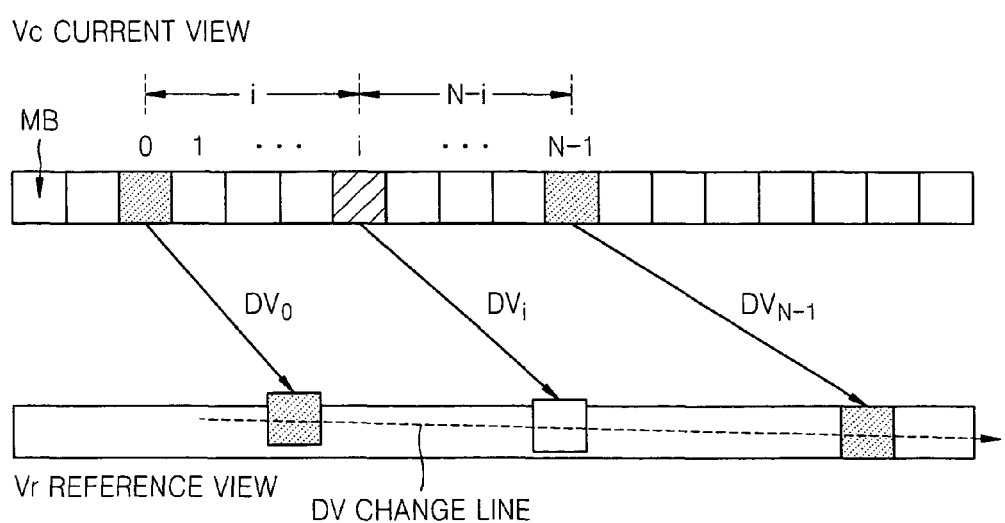
FIG. 8 is a view for explaining a method of estimating a disparity vector of an adjacent macroblock using a disparity vector DV of an encoded macroblock, according to an exemplary embodiment of the present invention.

FIG. 8 is a view for explaining a method of estimating a disparity vector of an adjacent macroblock using a disparity vector DV of an encoded macroblock, according to an exemplary embodiment of the present invention.

In FIG. 8, Vc and Vr respectively represent lines of macroblocks (MBs) in arbitrary frames disposed on the same time sequence, where Vr represents an encoded reference view frame and Vc represents a frame estimated using the encoded reference view frame Vr, and wherein $V_c$ is to be currently encoded. Macroblocks denoted by dotted lines are estimated macroblocks, that is, "seed-MBs". A macroblock denoted by oblique lines represents a "non-seed MB" whose disparity vector will be estimated using the seed-MBs.

A disparity vector of a different MB between two seed-MBs, that is, a disparity vector of a non-seed MB can be estimated using the seed-MBs disposed on a Vr frame, using the disparity vector interpolation method according to an exemplary embodiment of the present invention. In order to estimate a disparity vector of a different MB between two seed-MBs, as illustrated in FIG. 8, the following Equation 3 is used:

$$DV_i = \frac{i}{N-1}DV_{N-1} + \left(1 - \frac{i}{N-1}\right)DV_0 \qquad (3)$$

In Equation 3, $DV_0$ and $DV_{N-1}$ represent the seed-MBs and are estimated using a related art method such as the full-search method or the fast-search method.

Figure 9:
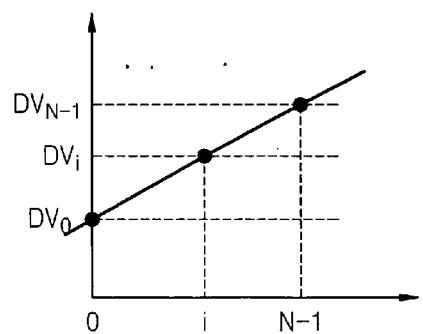
FIG. 9 is a graph illustrating correlation of disparity vectors when deviation of the disparity vectors is constant as illustrated in FIG. 8.

When deviation of disparity vectors is constant as illustrated in FIG. 8, correlation of the disparity vectors can be expressed as a graph as illustrated in FIG. 9. That is, if it is assumed that a ratio at which the size of a disparity vector DV changes from $DV_0$ to $DV_i$ when a distance between MBs is i is equal to a ratio at which the size of the disparity vector DV changes from $DV_i$ to $DV_{N-1}$ when a distance between MBs is from i to N−1, Equation 3 can be deduced using Equations 3-1, 3-2, and 3-3 as follows:

$$\frac{DV_i - DV_0}{i} = \frac{DV_{N-1} - DV_0}{N-1} \qquad (3\text{-}1)$$

$$DV_i - DV_0 = \left(\frac{DV_{N-1} - DV_0}{N-1}\right) \times i \qquad (3\text{-}2)$$

$$DV_i = \left(\frac{DV_{N-1} - DV_0}{N-1}\right) \times i + DV_0 \qquad (3\text{-}3)$$

Figure 10:
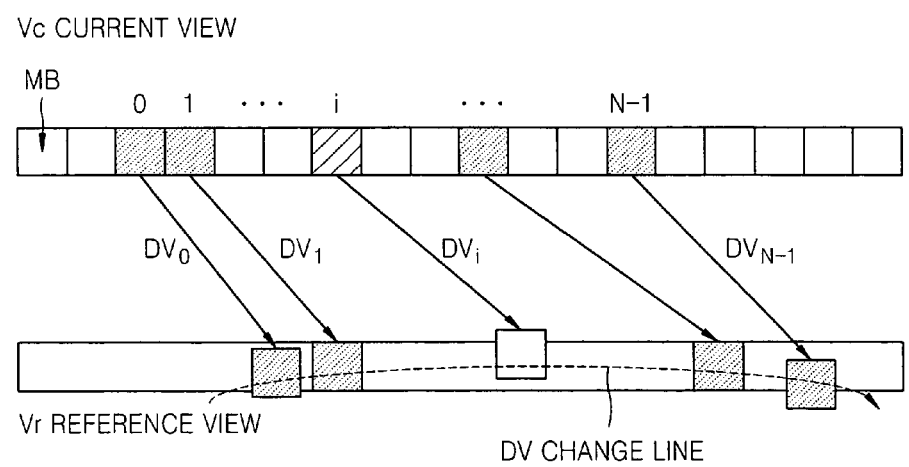
FIG. 10 is a view for explaining a method of estimating a disparity vector of an adjacent macroblock using a disparity vector DV of an encoded macroblock, according to another exemplary embodiment of the present invention.

FIG. 10 is a view for explaining a method of estimating a disparity vector of an adjacent macroblock using a disparity vector DV of an encoded macroblock, according to another exemplary embodiment of the present invention.

Figure 11:
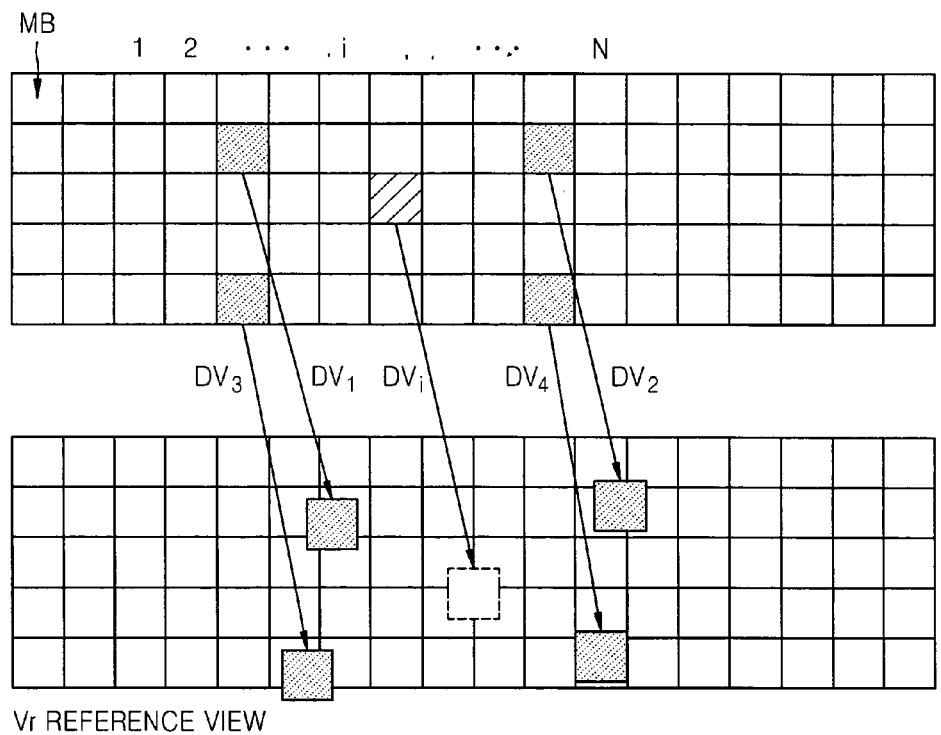
FIG. 11 is a view for explaining a method of estimating a disparity vector of an adjacent macroblock using a disparity vector DV of an encoded macroblock, according to another exemplary embodiment of the present invention.

Equation 3 is useful when a change of disparity vectors DV, that is, a deviation of disparity vectors DV is nearly constant as described above with reference to FIG. 8. However, when a deviation of disparity vectors DV is not constant, for example, when a change of disparity vectors DV has a curve form, for example, as illustrated in FIG. 11, the disparity vectors DV can be estimated using Equation 4 as follows:

$$DV_i = \sum_{h=-\frac{N}{2}}^{\frac{N}{2}-1} c_h DV_{i+h} \qquad (4)$$

As seen in FIG. 10 and Equation 4, a disparity vector $DV_i$ for an i-th MB is estimated using two or more disparity vectors DV. In Equation 4, $DV_{i+h}$ represents a disparity vector for a non-seed MB and $C_h$ represents an interpolation coefficient for generating a disparity vector DV for a MB. In order to understand Equation 4, an operation of calculating an i-th disparity vector $DV_i$ will be described below. For example, if i=4 and N=8, Equation 4 can be rewritten as Equation 4-1.

$$DV_4 = c_{-4}DV_0 + c_{-3}DV_1 + c_{-2}DV_2 + c_{-1}DV_3 + c_0DV_4 + c_1DV_5 + c_2DV_6 + c_3DV_7 \qquad (4\text{-}1)$$

In Equation 4-1, if arbitrary disparity vectors not corresponding to seed-MBs, that is, $DV_2$, $DV_4$, $DV_6$, and $DV_8$ are set to 0 when disparity vectors $DV_1$, $DV_3$, $DV_5$, and $DV_7$ correspond to seed-MBs, a disparity vector $DV_4$ can be determined.

FIG. 11 is a view for explaining a method of estimating a disparity vector of an adjacent macroblock using a disparity vector DV of an encoded macroblock, according to another exemplary embodiment of the present invention.

In FIG. 11, the disparity vector is two-dimensionally estimated using Equation 5 as follows:

$$DV(x, y) = \sum_{v=-\frac{M}{2}}^{\frac{M}{2}} \sum_{h=-\frac{N}{2}}^{\frac{N}{2}} c(x+h, y+v) DV(x+h, y+v) \qquad (5)$$

In Equation 5, C(x, y) is a two-dimensional coefficient for generating a disparity vector DV for a macroblock. If the disparity vector DV(x+h, y+v) is set to 0 when the disparity vector DV(x+h, y+v) does not correspond to a seed-MB, the disparity vector DV(x, y) can be calculated using only the value of the seed-MB. Equation 5 can be used when an area which is able to be obtained using the disparity vector interpolation method according to an exemplary embodiment of the present invention is wide.

Figure 12:
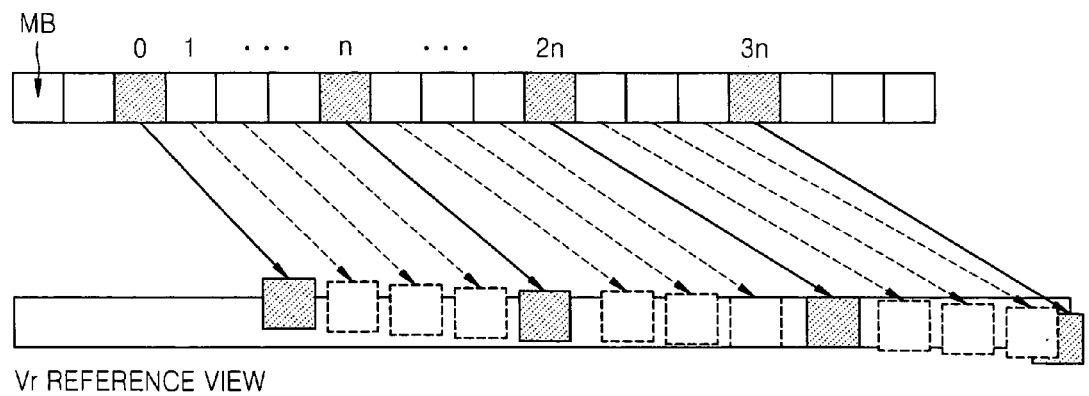
FIG. 12 is a view for explaining a method of estimating a disparity vector, according to an exemplary embodiment of the present invention.

FIG. 12 is a view for explaining a method of estimating a disparity vector, according to an exemplary embodiment of the present invention.

As described above, in order to estimate disparity vectors, first, a related art disparity vector search method may be performed and disparity vectors for seed-MBs are obtained. The seed-MBs can be separated from each other with a constant interval in order to simplify calculation. The disparity vector search may be performed between a current frame and a reference frame. Then, disparity vectors for MBs adjacent to the remaining seed-MBs can be calculated and obtained using the seed-MBs and the disparity vector interpolation method according to an exemplary embodiment of the present invention.

Also, a predetermined interpolation equation used in the disparity vector interpolation method according to an exemplary embodiment of the present invention can be selected according to the characteristic of disparity vectors determined for macroblocks encoded in advance, that is, seed-MBs. Here, the characteristic of the disparity vectors can be information indicating whether deviation of estimated disparity vectors is constant, as described above in Equations 3 and 4. Also, in the direct mode, Equations 3, 4, and 5 are preferably determined when the multi-view moving picture encoding apparatus and the multi-view moving picture decoding apparatus are designed. Also, Equations 3, 4, and 5 must be shared by the multi-view moving picture encoding apparatus and the multi-view moving picture decoding apparatus.

Hereinafter, a method of estimating disparity vectors and encoding a multi-view moving picture, according to another exemplary embodiment of the present invention, will be described.

Disparity vectors obtained using the disparity vector interpolation method according to an exemplary embodiment of the present invention are reliable values, which however, may have errors. Accordingly, in order to obtain high compression performance, both the disparity vector interpolation method according to an exemplary embodiment of the present invention and a related art disparity vector search method, for example, the full-search method or the fast-search method, can be performed.

That is, according to an exemplary embodiment of the present invention, compressibility for disparity vector interpolation is compared with compressibility for a disparity vector search. If the compressibility for the disparity vector interpolation is equal to or higher than the compressibility for the disparity vector search, the result of the disparity vector interpolation method is finally used. When the result of the disparity vector interpolation is used, a receiving terminal can regenerate the result of the disparity vector interpolation with only information regarding how disparity vectors DV are generated without information regarding the disparity vectors DV.

When the disparity vector search is finally used because the compressibility for the disparity vector search is higher than the compressibility for the disparity vector interpolation, disparity vectors DV must be encoded and transmitted. At this time, according to an exemplary embodiment of the present invention, if a difference between a disparity vector DV obtained by the disparity vector search and a disparity vector DV obtained by the disparity vector interpolation is small, the difference can be transmitted.

Accordingly, when a frame is encoded, a macroblock MB obtained by the disparity vector search must be distinguished from a macroblock MB obtained by the direct mode of the present invention. By defining a flag flag_direct for the direct mode as follows, macroblocks MBs can be distinguished according to the respective methods:
DV obtained by disparity vector search: flag_direct=0
DV obtained by a direct mode: flag_direct=1.

It is also possible that a flag flag_direct of a disparity vector DV obtained by the disparity vector search is set to 1 and a flag flag_direct of a disparity vector DV obtained by the direct mode is set to 0. If a flag for a MB-mode is the direct mode, a decoding terminal can calculate a disparity vector DV using a disparity vector interpolation equation, such as Equation 3, 4, or 5. An equation to be used among Equations 3, 4, and 5 is defined in advance in an encoding terminal and the decoding terminal.

Meanwhile, in order to distinguish the case when the difference between the disparity vector DV obtained by the disparity vector search and the disparity vector DV obtained by the direct mode is transmitted, from the case when the disparity vector DV obtained by the basic disparity vector search is transmitted, a flag flag_diff can be defined and used. Although a multi-view moving picture is encoded by search mode encoding, if the difference between the disparity vector DV_d obtained by the disparity vector interpolation and the disparity vector DV_f obtained by the disparity vector search is small, encoding the difference value is efficient to increase compressibility.

If flag_diff=0, DV obtained by disparity vector search is transmitted.

If flag_diff=1, a difference between DV obtained by disparity vector search and DV obtained by a direct mode is transmitted.

The values of the flag flag_diff can be set in reverse order to the above.

Accordingly, in the multi-view moving picture encoding method according to an exemplary embodiment of the present invention, three different modes can be defined.
First mode: (flag_direct=1) & (flag_diff=0 or 1)
Second mode: (flag_diect=0) & (flag_diff=1)
Third mode: (flag_direct=0) & (flag_diff=0)

Since the first mode is the direct mode, only a residual picture is encoded and transferred to the decoder. In the second mode, a residual picture and a difference between a disparity vector obtained by the direct mode and a disparity vector obtained by the disparity vector search mode is encoded and transferred to the decoder. In the third mode, a residual picture and a disparity vector obtained by the disparity vector search are encoded and transferred to the decoder.

Figure 13:
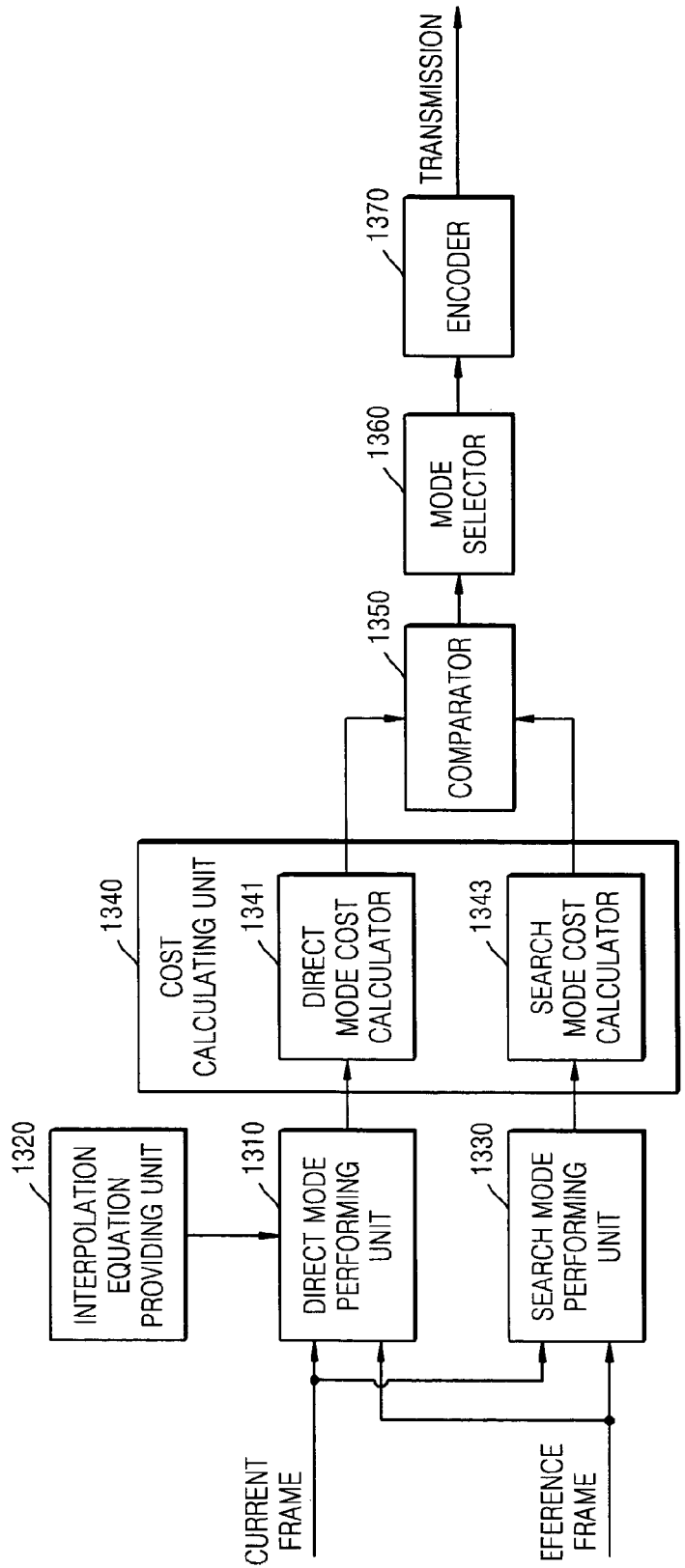
FIG. 13 is a block diagram of a multi-view moving picture encoder according to another exemplary embodiment of the present invention.

FIG. 13 is a block diagram of a multi-view moving picture encoding apparatus according to another exemplary embodiment of the present invention.

Referring to FIG. 13, the multi-view moving picture encoding apparatus includes a direct mode performing unit 1310, an interpolation equation providing unit 1320, a search mode performing unit 1330, a cost calculating unit 1340 including a direct mode cost calculator 1341 and a search mode cost calculator 1343, a comparator 1350, a mode selector 1360, and an encoder 1370.

Referring to FIG. 13, a current frame and a reference frame are input to the direct mode performing unit 1310. The direct mode performing unit 1310 encodes in advance a predetermined number of macroblocks of a frame to be encoded, and estimates disparity vectors for the predetermined number of the encoded macroblocks, that is, disparity vectors for seed-MBs, using a related art disparity vector search method.

Then, the direct mode performing unit 1310 calculates disparity vectors of macroblocks adjacent to the encoded macroblocks using the estimated disparity vectors, and the disparity vector interpolation method according to an exemplary embodiment of the present invention. That is, by interpolating disparity vectors using a predetermined interpolation equation provided by the interpolation equation providing unit 1320, disparity vectors DV_d according to the direct mode may be calculated.

Also, the direct mode performing unit 1310 generates a compensated frame using the disparity vectors DV_d and the reference frame, subtracts an original frame from the compensated frame, and generates a residual picture of the current frame. The direct mode performing unit 1310 transfers the generated disparity vectors DV_d and the residual picture to the direct mode cost calculator 1341 of the cost calculating unit 1340.

The interpolation equation providing unit 1320 stores at least one interpolation equation, for example, Equation 3, 4, or 5, which can be selected according to the characteristic of disparity vectors estimated for the predetermined number of the encoded macroblocks. Accordingly, the direct mode performing unit 1310 can determine disparity vectors using the interpolation equation provided by the interpolation equation providing unit 1320.

The current frame and the reference frame are also input to the search mode performing unit 1330. The search mode performing unit 1330 determines disparity vectors DV_f using the related art disparity vector search method, creates a compensated frame using the disparity vectors DV_f and the reference frame, subtracts an original frame from the compensated frame, and generates a residual picture of the current frame. The search mode performing unit 1330 transfers the generated disparity vectors DV_f and the residual picture to the search mode cost calculator 1343 of the cost calculating unit 1340.

The direct mode cost calculator 1341 calculates a cost for the result subjected to the direct mode. That is, the direct mode cost calculator 1341 receives the disparity vectors DV_d and the residual picture, and calculates a cost between the corresponding non-seed MB and a MB compensated using the disparity vectors DV_d obtained by disparity vector interpolation The search mode cost calculator 1343 calculates a cost for the result subjected to the search mode. That is, the search mode cost calculator 1343 receives the disparity vectors DV_f and the residual picture, and calculates a cost between the corresponding non-seed MB and a MB compensated using the disparity vectors DV obtained by disparity search. The cost can be determined by calculating or estimating a bit rate or a peak signal to noise ratio (PSNR) of a compressed picture. Here, the cost can be determined using only the bit rate or using only the PSNR. Alternatively, the cost can be determined considering both a bit rate or PSNR according to predetermined criteria.

The comparator 1350 compares the result calculated by the direct mode cost calculator 1341 and the result calculated by the search mode cost calculator 1343, and transfers the comparison result to the mode selector 1360. The comparator 1350 can compare a difference between a direct mode cost (that is, the result calculated by the direct mode cost calculator 1341) and a search mode cost (the result calculated by the search mode cost calculator 1343) with a predetermined threshold value. If the difference between the direct mode cost and the search mode cost is greater than the predetermined threshold value, the comparator 1350 compares a difference between a disparity vector obtained by the disparity vector interpolation according to an exemplary embodiment of the present invention and a disparity vector obtained using the related art disparity vector search method, with a predetermined threshold value, and transfers the comparison result to the mode selector 1360.

The mode selector 1360 determines a flag on the basis of the comparison result and determines an encoding mode according to the determined flag. If the mode selector 1360 receives a result indicating that the difference between the two cost functions is smaller than the predetermined threshold value from the comparator 1350, the mode selector 1360 can set the flag flag_direct to 1 for encoding according to the direct mode according to an exemplary embodiment of the present invention. Also, if the difference between the two cost functions is greater than the predetermined threshold value, the mode selector 1360 can set the flag flag_direct to 0 in order to determine a disparity vector using the related art disparity vector search method and encode a multi-view picture.

If the flag flag_direct is set to 0, the mode selector 1360 receives the comparison result obtained by comparing the difference between the disparity vector obtained using the disparity vector interpolation method according to an exemplary embodiment of the present invention and the disparity vector obtained using the related art disparity vector search method, with the predetermined threshold value, from the comparator 1350, and determines a flag flag_diff. If the difference is smaller than the predetermined threshold value, the mode selector 1360 can set the flag flag_diff to 1. If the difference is greater than the predetermined threshold value, the mode selector 160 can set the flag flag_diff to 0.

If flag_direct=1 and flag_diff=0 or 1, the mode selector 1360 can set the first mode. If flag_direct=0 and flag_diff=1, the mode selector 160 can set the second mode. If flag_direct=0 and flag_diff=0, the mode selector 160 can set the third mode.

The encoding mode can be determined using another alternative method besides using the flag. The mode selector 1360 can set a mode information to indicate the encoding mode. The mode information is included in the multi-view moving picture bitstream and transferred.

The encoder 1370 encodes and transmits a multi-view moving picture according to the mode determined according to the determined flag information. If flag_direct=1 (the first mode), the encoder 1370 encodes and transmits only flag information and a residual picture. If flag_direct=0 and flag_diff=1 (the second mode), the encoder 1370 encodes and transmits the residual picture and the difference between the disparity vector by the direct mode and the disparity vector by the search mode. If flag_direct=0 and flag_diff=0 (the third mode), the encoder 1370 encodes and transmits the residual picture and the disparity vector by the search mode.

Figure 14:
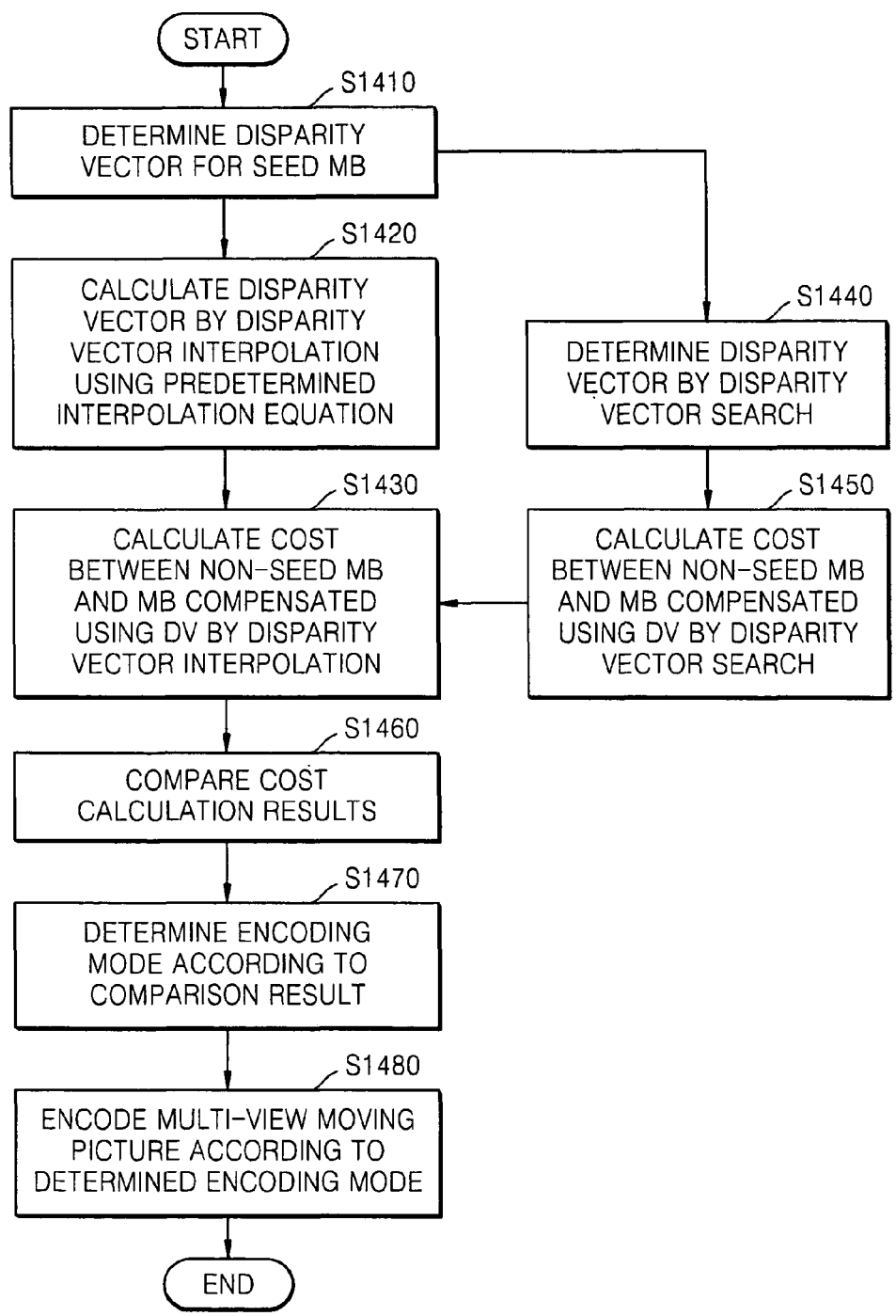
FIG. 14 is a flowchart illustrating a multi-view moving picture encoding method according to another exemplary embodiment of the present invention.

FIG. 14 is a flowchart illustrating a multi-view moving picture encoding method according to another exemplary embodiment of the present invention.

Disparity vectors for a predetermined number of macroblocks encoded in advance, that is, disparity vectors for seed-MBs are determined using a related art disparity vector estimation method (operation S1410). Then, disparity vectors are calculated by disparity vector interpolation using a predetermined interpolation equation, in the direct mode performing unit 1310 (operation 1420). Successively, the direct mode cost calculator 1341 receives the disparity vector DV_d and the residual picture generated by the direct mode performing unit 1310, and calculates a cost between a non-seed MB and a MB compensated using the disparity vector DV_d by the disparity vector interpolation (operation S1430).

Meanwhile, the search mode performing unit 1330 determines disparity vectors DV_f using the related art disparity vector search method (operation S1440). The search mode cost calculator 1343 receives the residual picture and the disparity vectors DV_f generated by the search mode performing unit 1330, and calculates a cost between a non-seed MB and a MB compensated using the disparity vectors DV_f by a disparity vector search (operation S1450).

The comparator 1350 compares the result calculated by the direct mode cost calculator 1341 and the result calculated by the search mode cost calculator 1343, and transfers the comparison result to the mode selector 1360 (operation S1460). The mode selector 1360 determines a flag on the basis of the comparison result and determines an encoding mode according to the determined flag (operation S1470). The encoder 1370 encodes a multi-view moving picture according to the encoding mode with the determined flag information (operation S1480).

Figure 15:
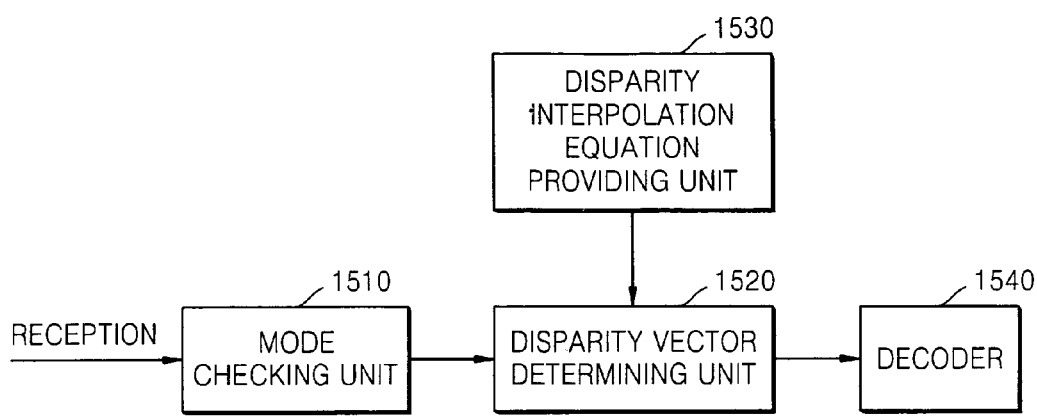
FIG. 15 is a block diagram of a multi-view moving picture decoder according to an exemplary embodiment of the present invention.

FIG. 15 is a block diagram of a multi-view moving picture decoding apparatus according to an exemplary embodiment of the present invention. The multi-view moving picture decoding apparatus includes a mode checking unit 1510, a disparity vector determining unit 1520, a disparity interpolation equation providing unit 1530, and a decoder 1540.

The mode checking unit 1510 determines using the mode information indicating a multi-view moving picture encoding mode included in a received multi-view moving picture bitstream. For example, the mode checking unit 1510 checks a flag indicating a multi-view moving picture encoding mode, that is, flag_direct and flag_diff, included in a received multi-view moving picture bitstream, and determines an encoding mode of the multi-view moving picture.

The disparity vector determining unit 1520 determines a disparity vector according to the checked encoding mode. The disparity interpolation equation providing unit 1530 stores the same disparity interpolation equation as that stored in the multi-view moving picture encoding apparatus and provides the disparity interpolation equation to the disparity vector determining unit 1520. The disparity vector determining unit 1520 can calculate a disparity vector for a multi-view moving picture encoded according to the direct mode using the disparity interpolation equation. The disparity interpolation equation providing unit 1530 can be included in the disparity vector determining unit 1520.

The disparity vector determining unit 1520 can calculate a disparity vector using the same interpolation equation as that stored in the multi-view moving picture encoder because a residual picture is transferred, when the disparity vector is determined in the first mode, that is, in the direct mode.

In the second mode, the residual picture and a difference value between the disparity vector DV_d by the direct mode and the disparity vector DV_f by the search mode are transferred. In the second mode, the disparity vector DV_f is a sum of the disparity vector DV_d and the difference value between the disparity vector by the direct mode and the disparity vector by the search mode. Since the disparity vector DV_d can be calculated using the disparity interpolation equation provided by the disparity interpolation equation providing unit 1530, the disparity vector DV_f can be obtained.

In the third mode, since the residual picture and the disparity vector by the search mode are transferred, the transferred disparity vector is used for decoding.

The decoder 1540 decodes a multi-view moving picture using the disparity vector determined according to the respective modes and residual moving picture data included in the multi-view moving picture bitstream received and transferred to the mode checking unit 1510.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion.

As described above, according to the exemplary embodiments of the present invention, by calculating disparity vectors for remaining macroblocks using disparity vectors estimated for a predetermined number of macroblocks without estimating disparity vectors for all the macroblocks when a disparity vector of a macroblock unit is estimated, it is possible to increase an encoding speed of a multi-view moving picture.

Also, according to the exemplary embodiments of the present invention, since encoding disparity vectors for all macroblocks is not needed, it is possible to enhance compressibility of a multi-view moving picture.

Also, according to the exemplary embodiments of the present invention, a multi-view moving picture decoding method and apparatus are provided for decoding an encoded multi-view moving picture using correlation between disparity vectors for a multi-view moving picture.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of estimating a disparity vector to encode a multi-view moving picture, the method comprising:
    estimating by an encoding apparatus, disparity vectors for a plurality of encoded macroblocks; and
    calculating by the encoding apparatus, disparity vectors of macroblocks adjacent to the encoded macroblocks using the estimated disparity vectors,
    wherein the calculating the disparity vectors comprises interpolating and calculating the disparity vectors of the macroblocks adjacent to the encoded macroblocks using an interpolation equation, and the interpolation equation is selected according to whether deviations of the disparity vectors estimated for the encoded macroblocks are constant.

2. The method of claim 1, wherein the estimating the disparity vectors comprises estimating the disparity vectors for the encoded macroblocks using a full-search method or a fast-search method.

3. A multi-view moving picture encoding apparatus comprising:
  a direct mode performing unit which receives a current frame and a reference frame, estimates disparity vectors for a plurality of encoded macroblocks, and calculates disparity vectors of macroblocks adjacent to the encoded macroblocks using the estimated disparity vectors;
  an interpolation equation providing unit which provides an interpolation equation for calculating the disparity vectors of the macroblocks adjacent to the encoded macroblocks to the direct mode performing unit;
  a search mode performing unit which receives the current frame and the reference frame and searches for the current frame and the reference frame to estimate disparity vectors;
  a cost calculating unit which calculates a direct mode cost according to a disparity vector determining method performed by the direct mode performing unit and a search mode cost according to a disparity vector determining method performed by the search mode performing unit;
  a comparator which compares the direct mode cost and the search mode cost with each other;
  a mode selector which selects an encoding mode according to a comparison result provided by the comparator; and
  an encoder which encodes a multi-view moving picture according to the selected encoding mode;
  the interpolation equation is selected according to whether deviations of the disparity vectors estimated for the encoded macroblocks are constant.

4. The apparatus of claim 3, wherein the direct mode performing unit estimates the disparity vectors for the encoded macroblocks using a full-search method or a fast-search method, and interpolates and calculates the disparity vectors of the macroblocks adjacent to the encoded macroblocks using an interpolation equation.

5. The apparatus of claim 4, wherein the interpolation equation providing unit stores at least one interpolation equation which can be selected according to a characteristic of disparity vectors estimated for the encoded macroblocks.

6. The apparatus of claim 3, wherein the cost calculating unit comprises:
  a direct mode cost calculator which calculates the direct mode cost using a disparity vector DV_d calculated by the direct mode performing unit; and
  a search mode cost calculator which calculates the search mode cost using a disparity vector DV_f estimated by the search mode performing unit.

7. The apparatus of claim 3, wherein the cost calculating unit calculates at least one of a bit rate and a peak signal to noise ratio for each of the direct mode and the search mode.

8. The apparatus of claim 6, wherein the comparator compares a difference between the direct mode cost and the search mode cost with a first threshold value, and
  the mode selector sets a flag according to the comparison result and selects an encoding mode according to the set flag.

9. The apparatus of claim 8, wherein the comparator compares a difference between the disparity vector DV_d and the disparity vector DV_f, with a second predetermined threshold value, if the difference between the direct mode cost and the search mode cost is greater than the first threshold value, and
  the mode selector sets the flag according to the comparison result and selects the encoding mode according to the set flag.

10. The apparatus of claim 3, wherein the encoder
  encodes a residual picture, if the selected encoding mode is a direct mode,
  encodes a residual picture and a difference between a disparity vector DV_d determined according to the direct mode and a disparity vector DV_f determined according to a search mode, if the selected encoding mode is the search mode and the difference between the disparity vector DV_d determined according to the direct mode and the disparity vector DV_f determined according to the search mode is smaller than a predetermined threshold value, and
  encodes the residual picture and the disparity vector DV_f determined according to the search mode, if the selected encoding mode is the search mode and the difference between the disparity vector DV_d determined according to the direct mode and the disparity vector DV_f determined according to the search mode is greater than the predetermined threshold value.

11. A method of encoding a multi-view moving picture, the method comprising:
  receiving a current frame and a reference frame;
  performing by an encoding apparatus, a direct mode operation by estimating disparity vectors for a plurality of encoded macroblocks, and calculating disparity vectors of macroblocks adjacent to the encoded macroblocks using the estimated disparity vectors;
  performing a search mode operation by searching for the current frame and the reference frame and estimating a disparity vector;
  calculating a cost for the direct mode and a cost for the search mode;
  comparing the cost for the direct mode with the cost for the search mode;
  selecting an encoding mode according to a comparison result of the comparing; and
  encoding a multi-view moving picture according to the selected encoding mode;
  wherein the calculating the disparity vectors comprises interpolating and calculating the disparity vectors of the macroblocks adjacent to the encoded macroblocks using an interpolation equation, and the interpolation equation is selected according to whether deviations of the disparity vectors estimated for the encoded macroblocks are constant.

12. The method of claim 11, wherein the performing the direct mode comprises:
  estimating the disparity vectors for the encoded macroblocks using a full-search method or a fast-search method; and
  interpolating and calculating the disparity vectors of the macroblocks adjacent to the encoded macroblocks using a predetermined interpolation equation.

13. The method of claim 11, wherein the calculating the cost for the direct mode and the cost for the search mode comprises:
  calculating the cost for the direct mode using a disparity vector DV_d estimated according to the direct mode; and
  calculating the cost for the search mode using a disparity vector DV_f estimated according to the search mode.

14. The method of claim 13, wherein the comparing the cost for the direct mode with the cost for the search mode comprises comparing a difference between the cost for the direct mode and the cost for the search mode with a first threshold value, and the selecting the encoding mode comprises setting a flag according to the result of the comparing, and selecting the encoding mode according to the set flag.

15. The method of claim 14, wherein the comparing the cost for the direct mode with the cost for the search mode comprises comparing a difference between a disparity vector DV_d determined according to the direct mode and a disparity vector DV_f determined according to the search mode, with a second threshold value, if the difference between the cost for the direct mode and the cost for the search mode is greater than the first threshold value, and selecting the encoding mode comprises setting a flag according to the result of the comparing and selecting the encoding mode according to the set flag.

16. The method of claim 11, wherein the calculating the cost for the direct mode and the cost for the search mode comprises calculating a bit rate or a peak signal to noise ratio for the direct mode or the search mode.

17. The method of claim 11, wherein the encoding the multi-view moving picture according to the selected encoding mode comprises:

encoding a residual picture if the selected encoding mode is the direct mode;

encoding the residual picture and a difference between a disparity vector DV_d determined according to the direct mode and a disparity vector DV_f determined according to the search mode if the selected encoding mode is the search mode and the difference between the disparity vector DV_d determined according to the direct mode and the disparity vector DV_f determined according to the search mode is smaller than a threshold value; and encoding the residual picture and the disparity vector DV_f determined according to the search mode, if the selected encoding mode is the search mode and the difference between the disparity vector DV_d determined according to the direct mode and the disparity vector DV_f determined according to the search mode is greater than the threshold value.

18. An apparatus for decoding a multi-view moving picture, the apparatus comprising:

an encoding mode checking unit which checks a mode information indicating an encoding mode included in a received multi-view moving picture bitstream to determine the encoding mode;

a disparity vector determining unit which determines a disparity vector according to the encoding mode determined by the encoding mode checking unit; and a decoder which decodes a multi-view moving picture, using a disparity vector determined according to the checked encoding mode and residual picture data included in the multi-view moving picture bitstream, wherein the disparity vector determining unit calculates the disparity vector using a same disparity vector interpolation equation as that used to encode the received multi-view moving picture;

wherein the disparity vector determining unit calculates the disparity vectors by using an interpolation equation, and the interpolation equation is selected according to whether deviations of the disparity vectors estimated for the encoded macroblocks are constant.

19. The apparatus of claim 18, wherein, if the encoding mode checked by the encoding mode checking unit is a first mode in which a residual picture is received, the disparity vector determining unit calculates the disparity vector using the disparity interpolation equation, and if the encoding mode checked by the encoding mode checking unit is a second mode in which the residual picture and a difference between a disparity vector DV_d determined according to a direct mode and a disparity vector DV_f determined according to a search mode are transmitted, the disparity vector determining unit calculates the disparity vector by summing the difference and the disparity vector calculated using the disparity vector interpolation equation.

20. A non-transitory computer-readable recording medium having embodied thereon a computer program for performing a method of estimating a disparity vector to encode a multi-view moving picture, the method comprising:

estimating disparity vectors for a plurality of encoded macroblocks; and calculating disparity vectors of macroblocks adjacent to the encoded macroblocks using the estimated disparity vectors, wherein the calculating the disparity vectors comprises interpolating and calculating the disparity vectors of the macroblocks adjacent to the encoded macroblocks using an interpolation equation, and the interpolation equation is selected according to whether deviations of the disparity vectors estimated for the encoded macroblocks are constant.

21. A non-transitory computer-readable recording medium having embodied thereon a computer program for performing a method of encoding a multi-view moving picture, the method comprising:

receiving a current frame and a reference frame;

performing a direct mode operation by estimating disparity vectors for a plurality of encoded macroblocks, and calculating disparity vectors of macroblocks adjacent to the encoded macroblocks using the estimated disparity vectors;

performing a search mode operation by searching for the current frame and the reference frame and estimating a disparity vector;

calculating a cost for the direct mode and a cost for the search mode;

comparing the cost for the direct mode with the cost for the search mode;

selecting an encoding mode according to a result of the comparing; and encoding a multi-view moving picture according to the selected encoding mode;

wherein the calculating the disparity vectors comprises interpolating and calculating the disparity vectors of the macroblocks adjacent to the encoded macroblocks using an interpolation equation, and the interpolation equation is selected according to whether deviations of the disparity vectors estimated for the encoded macroblocks are constant.

* * * * *